United States Patent [19]

Clarkson

[11] Patent Number: 4,459,584
[45] Date of Patent: Jul. 10, 1984

[54] AUTOMATIC LIQUID LEVEL INDICATOR AND ALARM SYSTEM

[76] Inventor: Marvin R. Clarkson, 4512 Cato St., Los Angeles, Calif. 90032

[21] Appl. No.: 340,528

[22] PCT Filed: Oct. 15, 1980

[86] PCT No.: PCT/US80/01378
§ 371 Date: Dec. 21, 1981
§ 102(e) Date: Dec. 21, 1981

[51] Int. Cl.³ .................. G08B 21/00; G01F 23/10
[52] U.S. Cl. ...................... 340/624; 73/321; 73/313; 137/558; 340/539; 340/618
[58] Field of Search ............... 340/539, 616, 617, 618, 340/619, 621, 622, 623, 624, 625; 73/308, 313, 321; 200/84 C; 324/117 H; 137/424, 558

[56] References Cited

U.S. PATENT DOCUMENTS

| | | | |
|---|---|---|---|
| 532,868 | 1/1895 | Bull | 340/624 |
| 1,133,013 | 3/1915 | Eberhart, Jr. | 73/313 |
| 2,936,623 | 5/1960 | Quist | 73/313 |
| 3,017,771 | 1/1962 | Bonhomme | 340/618 X |
| 4,168,494 | 9/1979 | Hummel et al. | 340/539 X |
| 4,194,177 | 3/1980 | Adamson | 340/618 X |
| 4,236,144 | 11/1980 | Sunagawa | 340/623 X |

FOREIGN PATENT DOCUMENTS

1381734 1/1975 United Kingdom ............ 340/539

Primary Examiner—John W. Caldwell, Sr.
Assistant Examiner—Daniel Myer
Attorney, Agent, or Firm—Albert O. Cota

[57] ABSTRACT

An automatic liquid level indicator and alarm system (10) that automatically emits an alarm when liquid in a vessel reaches a preselected low or high level. The system (10) is particularly adaptable for use on petroleum storage tanks (50) of the type found on petroleum tank farms. The system (1) comprises a low-level and a high-level permanent magnet (10) (11); a low-level and a high-level magnetic sensor (24) (25); an encoder-RF transmitter (15) (16); an RF receiver-decoder (18) (19); an alpha-numeric display (20) and an audible alarm (21). The magnets (10) (11) are attached to an existing movable tape (31) whose position at any instant is relative to the position of a float (41) within the tank (50). The magnets (10) (11) are located at positions indicative of the preselected low or high level marks. When either magnet (10) (11) is juxtaposed with its respective sensor (24) (25) a signal is transmitted by the encoder-RF transmitter (15) (16) and is received by the RF receiver-decoder (18) (19) located at a remote monitor station. The signal is displayed on the display (20) and simultaneously the alarm (21) is energized to alert station personnel of the incoming signal.

18 Claims, 19 Drawing Figures

AUTOMATIC LIQUID LEVEL INDICATOR AND ALARM SYSTEM

TECHNICAL FIELD

The invention pertains to liquid level indicators and especially to indicators that operate by using a combination of mechanical and electronic solid-state components to provide high and/or low liquid level alert signals to personnel located at remote locations. The invention is particularly adaptable for use on petroleum storage tanks to provide an automatic alert signal when the petroleum level in the tanks reaches a pre-selected high level or low level mark.

BACKGROUND ART

Industry and safety standards require that liquid storage tanks, and particularly petroleum storage tanks of the type located on petroleum tank farms, be given periodic checks to determine the liquid level of each tank.

The state-of-the-art in liquid level indicators is comprised of an apparatus consisting basically of a metal tape; an in-line tube assembly; a set of wheel pulleys; a float assembly; a take-up reel; and a mechanical liquid level indicator. One end of the tape is connected to the float, while the other is connected to the take-up reel. The tape is transported between the two termination points by the wheel pulleys. Both the tape and wheel pulleys are enclosed within the in-line tube assembly consisting of a horizontal tube and two vertical tubes. One of the vertical tubes is attached to the top of the tank while the other is attached to a tank-external housing containing the take-up reel. The housing also includes a mechanism that in combination with the take-up reel and float allows the liquid level to be directly displayed and viewed through a window on the housing. Some of the current devices also have a receiver, hard-wired to the mechanical apparatus, to allow the liquid level to be monitored at a remote station. Some of the major problems inherent in the current apparatus include:

a. Prior to installing conduit for a remote receiver it is necessary that building and fire permits be obtained; that area plot maps be available; and that ground be distrubed to run the conduit. Additionally, when a large number of tanks are located on a large parcel of land the installation costs can be prohibitive.

b. The installation of liquid activated switches that when closed energize an alarm circuit may require, in cases where tank contains volatile liquid, that the tank be emptied and purged before installation can commence.

c. The existing apparatus is dependent on an external power source. Therefore, if there is a primary power failure the apparatus ceases to function.

d. Some current apparatus require that the signal generation and emitting elements come in contact with the liquid in the tank. If the liquid is corrosive it may be necessary that the elements be made or protected by special material.

e. Existing apparatus using telephone lines to transmit liquid level signals are subject to accidental line breakage and/or deterioration by exposure to the elements.

The solutions to the above listed problems are given in the Disclosure of Invention section.

The prior art searched did not disclose any patents or publications that were directly related to an automatic liquid level indicator and alarm system of the type disclosed herein. However, the following U.S. Patents were considered in the investigation and evaluation of the prior art relative to the existing apparatus used with the invention:

| U.S. PAT. NO. | INVENTOR | ISSUED |
| --- | --- | --- |
| 3,148,542 | Clift | 02/09/61 |
| 3,200,645 | Levins | 08/17/65 |
| 3,459,042 | Brown | 08/05/69 |
| 3,484,774 | Borgnakke | 12/16/69 |
| 3,646,293 | Howard | 02/29/72 |

The Clift patent describes the apparatus that interfaces with the preferred, second and third embodiments of the invention. Clift describes a method for gauging the liquid level in a tank by means of mechanical apparatus. The apparatus involves a float having a tape attached thereto which extends over wheel pulleys to the tank exterior where visual indicia correlated to the liquid level height can be read directly at the tank. The Levins patent relates to electric position sensors of the variable resistance type that are packaged in a measurement probe used to measure the level of liquid in a tank. Brown describes a solid-state telemetering device that includes a float-operated sensing unit that senses changes in liquid level. Borgnakke discloses a magnetically actuated liquid level indicator consisting of a stand pipe containing magnetic multiple ball swimmers. Outside along the stand pipe is a series of magnetic electric switches that are closed by the swimmers and that are connected to indicators. The Howard patent also uses magnetic switches activated by magnets moving past the switches. The switches generate signals indicative of the movement of the magnets.

DISCLOSURE OF INVENTION

The Automatic Liquid Level Indicator and Alarm System automatically transmits a signal to a remotely located receiver when the liquid in a storage tank reaches a preselected high-level or low-level mark. The solid-state System is designed to be used with and in combination with the existing apparatus described in the Background Art section. The elements in the system that modify the current apparatus include: a low-level magnet; a high-level magnet; a magnetic sensing device; an encoder; an RF transmitter; an RF receiver; a decoder and a display/alarm. The apparatus is modified by attached the low-level magnet and the high-level magnet to the tape so that when the tank float is at its low-level position (tank nearly empty) the low-level magnet is positioned directly across the low-level sensor; when the float is at its high-level position (tank nearly full) the high-level magnet is positioned directly across the high-level sensor. When either magnet is directly across its corresponding sensor a signal, that is peculiar to a specific tank, is produced that triggers the encoder/RF transmitter. The RF transmitter transmits the encoded signal and is subsequently received by an RF receiver/decoder located at a remote monitor station. The decoded signal is visually displayed and simultaneously an alarm is activated to alert monitor personnel of a potential problem tank. A third embodiment of the invention uses a mechanical switch in lieu of the magnetic sensing device and corresponding magnets.

The solutions to problems inherent in the current apparatus listed in the Background Art section follow—each letter preceding the solution corresponds to the problem letter:

a. No special permits or additional land is required to install the invention since the invention is self sufficient and requires no interconnecting wiring to obtain power or to transmit data.

b. The installation of the invention can be accomplished with minimum teardown of the existing apparatus and does not require that the tank be emptied—the tank structural integrity is never violated.

c. The invention is self-sustaining having an independent solid-state low-maintenance power source.

d. None of the elements of the invention come in contact with the liquid stored in the tank.

e. The invention uses RF propagation to transmit data.

In addition to solving many of the problems inherent in existing systems it is also an objective of the invention to provide a system that:

a. Requires no special training to install or operate;

b. Does not require an FCC license to operate;

c. Has provisions, if required, to install a second receiver at a further extended site via telephone lines;

d. Will reduce the incidents of tank spillage which can be hazardous to both life and property—especially when flammable liquids are involved and e. Is reliable, easily maintained, and conserves energy.

BRIEF DESCRIPTION OF DRAWINGS

The details of the invention are described in connection with the accompanying drawings in which.

BEST MODE FOR CARRYING OUT THE INVENTION

The Automatic Liquid Level Indicator and Alarm System 10 is described in terms of three major embodiments. The first description is considered to be the best mode for carrying out the invention (preferred embodiment) and is depicted in FIGS. 1 through 8, 12 and 13. The System 10 in which all electronic elements are solid-state devices is designed to be used with, and in combination with an existing liquid level gauging apparatus 30 of the type described in U.S. Pat. No. 3,148,542.

The figure reference numbers from 10 to 29 pertain to the System 10 while the numbers from 30 to 43 pertain to the apparatus 30. The ten views show a System 10 that is comprised of twenty major elements: a low-level permanent magnet 11; a high-level permanent magnet 12; a dual magnetic sensing device 13, having therein a low-level sensor 24 and a high-level sensor 25; a Type 802R-CWF conduit outlet box manufactured by Killark Electric Manufacturing Company of St. Louis, Mo. U.S.A. and sold under the trademark Condulet 14; an encoder 15; an RF transmitter 16; a encoder-transmitter enclosure 22; a solar-cell panel 17; an RF receiver 18; a decoder 19; a receiver-decoder enclosure 23; an alpha-numeric display 20; an audible alarm 21; a low-level trigger oscillator 28a, a high-level trigger oscillator 28b; a low-level flasher 28c; a high-level flasher 28d; and an audio-visual reset switch 29.

The apparatus 30 is comprised of a metal tape 31; an in-line tube assembly consisting of a horizontal tube 32, a tube coupler 33, a first vertical tube 34, a second vertical tube 35, a first elbow fitting 36, and a second elbow fitting 37; a free rotating pulley wheel system consisting of a first pulley wheel 38 and a second pulley wheel 39; a float assembly 40; a housing 41; a take-up reel 42 and a mechanical dial counter 43.

Figure 1:
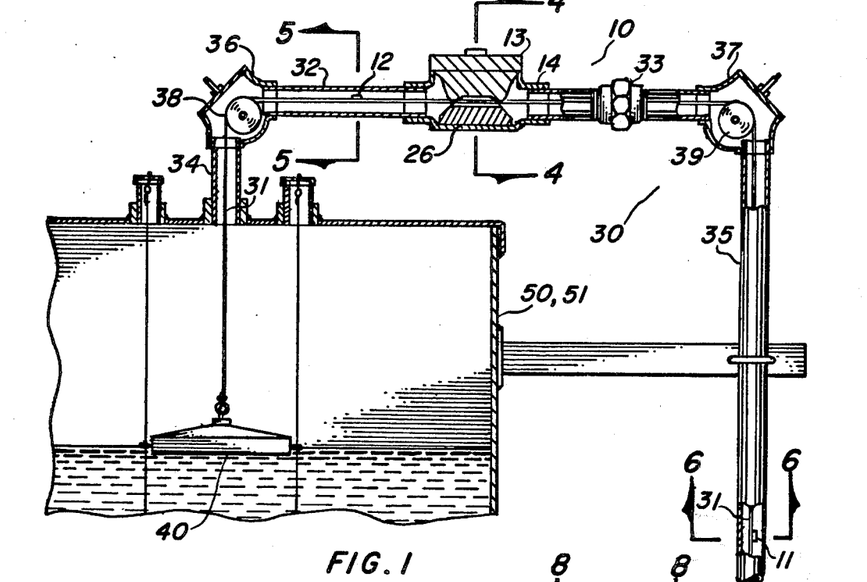
FIG. 1 is a partial cross sectional view and cutaway of the preferred embodiment.
Figures 2, 3, 4:
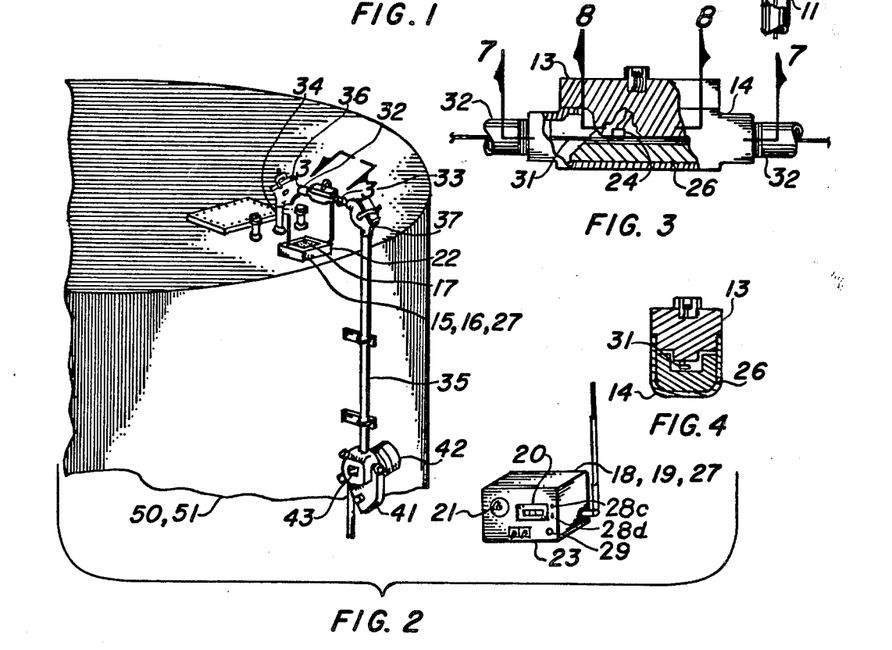
FIG. 2 is a partial isometric view of the embodiment including the existing liquid level gauging apparatus.
FIG. 3 is a cutaway view of the sensing device and enclosure.
FIG. 4 is a cross sectional view of the sensing device taken along lines 4—4 of FIG. 1.
Figure 5:
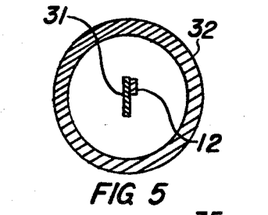
FIG. 5 is a cross sectional view, rotated 90° to clarify the magnet position, taken along line 5—5 of FIG. 1.
Figure 6:
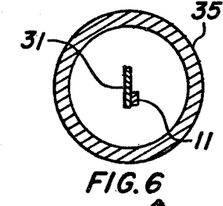
FIG. 6 is a cross sectional view taken along lines 6—6 of FIG. 1.
Figure 7:
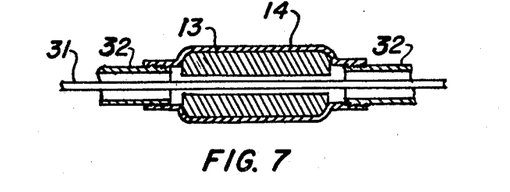
FIG. 7 is a cross sectional view taken along lines 7—7 of FIG. 3.
Figure 8:
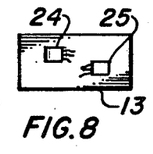
FIG. 8 is a full view taken along lines 8—8 of FIG. 3.
Figure 9:
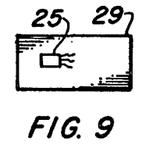
FIG. 9 is a view taken along lines 9—9 of FIG. 11.
Figure 10:
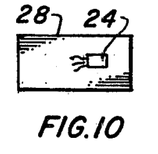
FIG. 10 is a view taken along lines 10—10 of FIG. 11.
Figure 11:
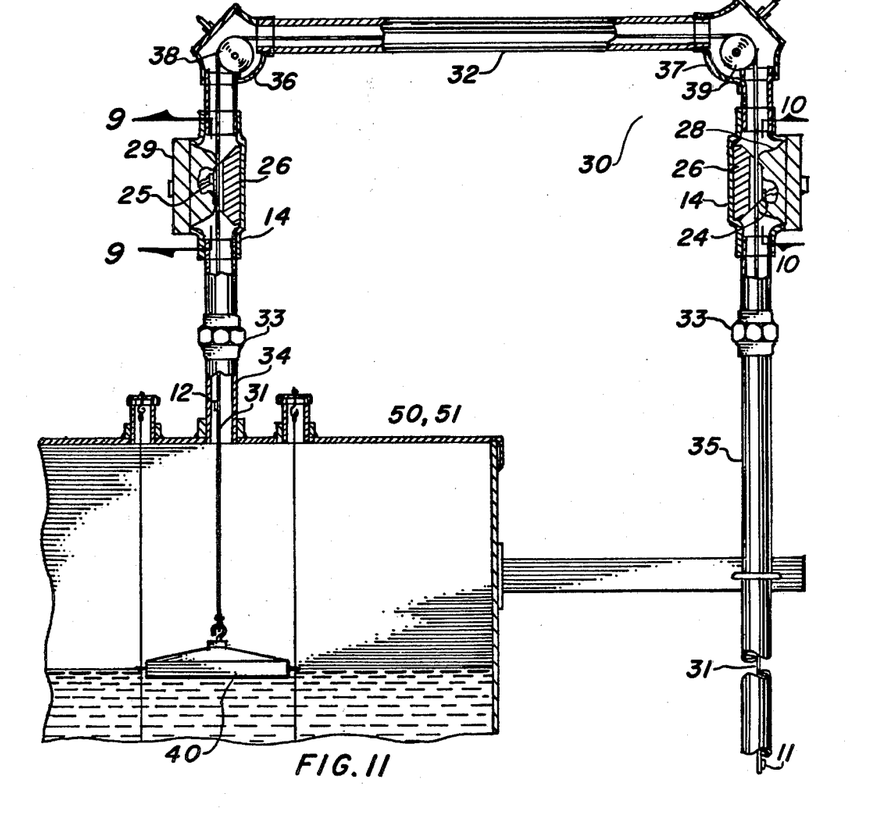
FIG. 11 is a cross sectional view of a second embodiment including the existing liquid level gauging apparatus.

The elements of the System 10 are shown in combination with the elements of the apparatus 30 in FIGS. 1 and 2. The integration is as follows: referring to FIGS. 5, 6 and 11 the low-level magnet 11 is rigidly attached to the top side and near one edge of the metal tape 31 by an adhesive such as epoxy. Likewise the high-level magnet 12 is attached to the top side and near the opposite edge of the tape 31 in a similar manner. The low-level magnet 11 is located on the tape 31 directly below the low-level sensor 24 when the float is located at its lowest position (tank nearly empty). Likewise the high-level magnet 12 is located on said tape 31 directly below the high-level sensor 25 when the float is at its highest level position (tank nearly full).

The Condulet 14 is attached in-line with the horizontal tube 32. This attachment is accomplished by removing a section of tubing from the horizontal tube 32 of sufficient length to allow the Condulet 14 to be inserted in its place and hermetically attached. The Condulet 14 has an opening on its upper surface sized to accept and hermetically attach the dual sensing device 13. Inside the Condulet 14 and opposite the opening for the sensing device 13 there is a tape guide structure 26 attached to the bottom of the Condulet 14, as shown in FIG. 4, by an adhesive such as epoxy. The tape guide 26 is dimensioned to provide an air space between the bottom of the low-level sensor 24 and high-level sensor 25 and the top surface of their corresponding low-level magnet 11 and high-level magnet 12 of no greater than 1.5875 cm (0.625 inches). This distance provides an optimum air coupling to allow an amplifier located in the sensors 24 and 25 to switch "on" as described below.

The low-level sensor 24 and high-level sensor 25 are magnetically-activated electronic, digital switches utilizing the "Hall Effect" for sensing the magnetic field provided by the low-level and high-level magnets 11 and 12. Each switch consists of a silicon Hall cell, an amplifier, a trigger and an output stage integrated with its own voltage regulator onto a monolithic silicon chip. A Type UGS-3019T Digital switch manufactured by Spraque Electric Company of Concord, N.H., U.S.A., or equivalent may be used in this application.

The switch amplifier is normally "off" when the magnetic field perpendicular to the surface of the silicon chip is below the threshold or "operate point" of the switch. When the magnetic field exceeds the "operative point", (this occurs when the magnets 11 or 12 are directly below the sensor 24 or 25), the amplifier switches "on" and produces a d-c current. The switch will again switch to "off" when the magnetic field is reduced below the "release point" which is less than the "operate point".

The d-c current produced by either sensor 24 or 25 is sufficient to energize a corresponding sensitive relay K4 (low-level) or K3 (high-level). Both relays are located in the encoder-transmitter enclosure 22 and are depicted schematically in their de-energized position in FIG. 12. When either relay is energized a ground circuit within the encoder 15 is completed, through relay contacts (9) and (10), that allows the encoder 15, which is normally in a standby condition, to become operational. With the encoder 15 operational an identification signal peculiar to a specific tank 50 or vessel 51 is generated and a relay K2, located outside the encoder 15, is energized allowing power to be applied to the transmitter 16.

Figure 12:
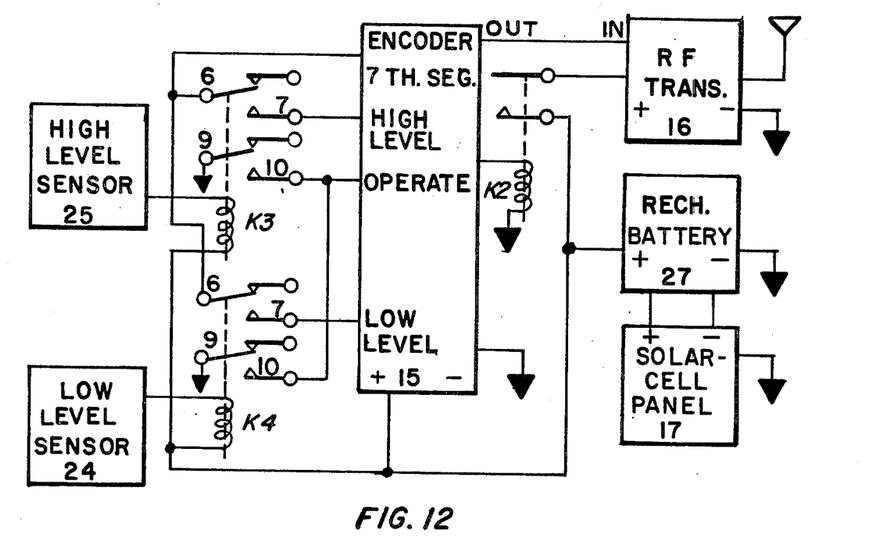
FIG. 12 is an electrical block diagram of the encoder-transmitter circuit used in the first and second embodiments.

When relay K4 is energized the identification signal includes a low-level component which is sent to the encoder 15 through relay contacts (6) and (7). The low-level component causes the seventh element of the display 20 to illuminate a letter "E" which signifies that the specific tank is in a nearly empty condition. Likewise, when relay K3 is energized a high-level component is sent to the encoder 15, through relay contacts (6) and (7). The high-level component causes the seventh element to illuminate with a letter "F" signifying that a tank is in a nearly full condition. The encoder 15 generates a repeating tank identification and level signal each time relay K3 or K4 is energized. An encoder such as a Type 409 DTMF Alarm Encoder manufactured by the Speedcall Corporation of Hayward, Calif. or equivalent may be used in this application.

The output of the encoder 15 is a dual-tone multi-frequency (DTMF) signal that is applied as shown in FIG. 12 to the input of an RF transmitter 16 that in the preferred embodiment operates in the 25-50 MHz range. The operating frequency of the transmitter 16 is flexible and is selected to comply with the RF frequency allocations of the particular state or country. A Model 810-035 Transmitter Unit manufactured by Repco of Orlando, Fla. U.S.A. or equivalent may be used in this application. Both the encoder 15 and transmitter 16 are located in the same enclosure 22 which in the preferred embodiment is located on the top surface of the tank 50 or vessel 51.

The 12 Vd-c power source required to operate the sensing device 13, encoder 15 and transmitter 16 is supplied by an internally located 12 Vd-c rechargeable battery pack 27. The charge on the battery is maintained at its proper level by a solar-cell panel 17 and associated circuitry. The panel 17 is attached as shown in FIG. 2, to the outside of the enclosure 22 at a location that provides optimum exposure to the sun.

Figure 13:
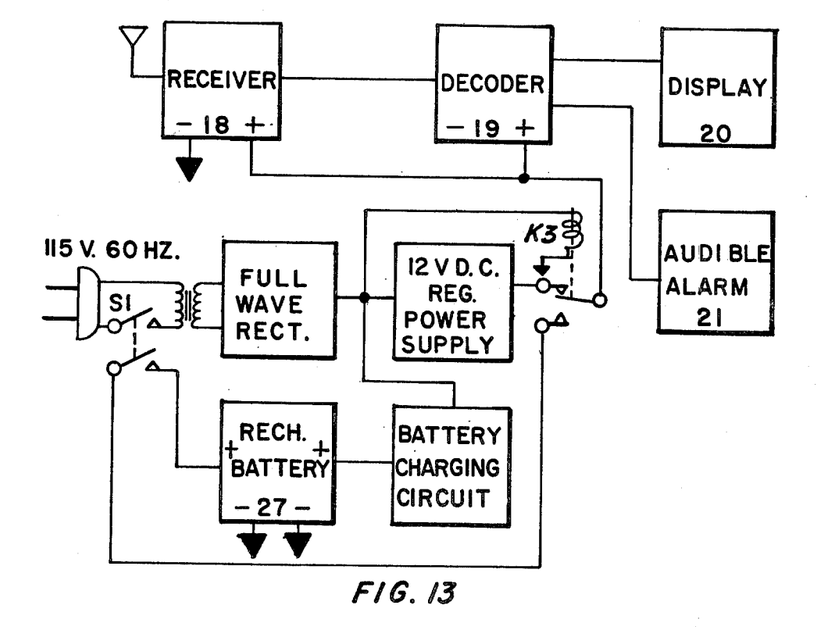
FIG. 13 is an electrical block diagram of the receiver-decoder circuit.

The transmitted DTMF signal from the transmitter 16 is received by a remotely located RF receiver 18 frequency tuned to receive signals in the 25-50 MHz range or other appropriate RF band. A model 810-056 Receiving Unit manufactured by Repco of Orlando, Fla. U.S.A. or equivalent may be used in this application. The receiver 18 output is connected, as also shown in FIG. 13 to the input of decoder 19. A Model 422 DTMF Decoder and Digital Display manufactured by the Speedcall Corporation of Hayward, Calif. U.S.A. or equivalent may be used in this application. The decoder 19 is designed to decode the DTMF signals from the encoder 15 and to display the decoded signal on the display 20. The display 20 visually reproduces the six-digit and one-letter DTMF signal on a series of seven 0.762 cm (0.3 inch), seven-segment, red, light emitting diodes (LED).

The decoder 19 is also connected to an audible alarm 21 and via the display 20 to a low-level flasher 28c, consisting of a yellow LED, and a high-level flasher 28d consisting of a red LED. The alarm and flashers are activated simultaneously with the display 20 and serve to alert the remote station personnel that a liquid level signal is being received. The alarm and flashers are located on the front panel of the enclosure 23 that houses both the receiver 18 and decoder 19.

The alarm 21 is activated by a signal generated within the decoder 19. The signal is applied to the alarm at the same time that the display circuit is energized.

The low-level flasher 28c and high-level flasher 28d are activated respectively by the low-level trigger oscillator 28a and high-level trigger oscillator 28b. The oscillators, which are triggered by a signal directly from the display 20, are designed to generate a signal that causes the flashers to illuminate at a repetition rate set by the oscillator frequency. The flashers remain energized together with the display 20 and alarm 21 until the audio-visual reset switch 29 is manually depressed. The audio-visual reset circuit is physically located within the decoder 19. However, the reset switch 29 is located on the front panel of the enclosure 23 for easy access by station personnel. When the reset switch 29 is depressed a power circuit is turned off causing the display 20, flasher 28c or 28d, and the alarm 21 to de-energize. The next turn-on cycle of the audio and visual devices occurs the next time either the low-level sensor 24 or high-level sensor 25 is juxtaposed with its respective low-level magnet 11 or high-level magnet 12.

The novelty in the oscillator and corresponding flasher circuit is inherent in the method used to derive the signal for triggering the oscillators. The trigger signal for the low-level trigger oscillator 28a is derived by connecting a lead from the "E" segment of the seventh element of the display 20 to the input of the low-level flasher 28c. The trigger signal for the high-level trigger oscillator 28b is derived by connecting a lead from the "G" segment of the seventh element of the display 20 to the input of the high-level flasher 28d. Thus, whenever the display 20 and specifically the seventh element is energized a signal is emitted that triggers either oscillator 28a or 28b which in turn causes either the low-level flasher 28c or high-level flasher 28d to illuminate.

The 12 Vd-c power required to operate the receiver 18 and decoder 19 is obtained by first closing power switch S1 which allows 115 V 60 Hz power to be applied to a full wave bridge rectifier as shown in FIG. 13. When S1 is closed relay K3 is energized and 12 Vd-c is applied directly from an internal 12 Vd-c regulated power supply. Switch S1 and relay K3 are shown respectively in their open and de-energized positions in FIG. 13. The enclosure 23 also includes a rechargeable battery pack 27 that is maintained at its proper voltage level by a charging circuit that is activated when S1 is closed and primary power is available. If a primary 115 V 60 Hz power failure should occur S1 remains closed and since there is no power, relay K3 is de-energized. With K3 de-energized the rechargeable battery pack 27 is connected into the power circuit.

The second embodiment of the Automatic Liquid Level Indicator and Alarm System 10, depicted in FIGS. 9 through 13, is also designed to be used with and in combination with an existing liquid level gauging apparatus 30 of the type described in U.S. Pat. No. 3,148,542.

The second embodiment includes the same element as are listed for the preferred embodiment except that: the dual magnetic sensing device 13 is replaced by a first magnetic sensing device 28 and a second magnetic sensing device 29 where sensing device 28 incorporates the low-level sensor 24 and sensing device 29 incorporates the high-level sensor 25; and two Condulets 14 rather than one are required to house the two sensing devices 28 and 29.

The apparatus 30 is the same as the one required for the preferred embodiment. The only difference is that the first vertical tube 34 and the second vertical tube 35 of the in-line tube assembly have been lengthened.

By increasing the length of the tubes 34 and 35 and by using two independent single sensing devices 28 and 29 the system 10 can be designed so that the magnets 11 and 12 need travel only in a vertical direction within the confines of the vertical tubes 34 and 35. That is, the magnets never pass over pulley wheels 38 and 39 housed in elbow fittings 36 and 37. This design is advantages when the shape of the fittings may empede the path of the magnets or when fittings are constructed of ferrous material and a possibility exists that if the magnets 11 or 12 were allowed to travel over the pulley wheels 38 and 39 they could be attracted to the fittings 36 or 38 causing the System 10 to malfunction.

The elements of the System 10 are ingegrated with the elements of the apparatus 30 as follows: The Condulet 14 housing the sensing device 28 incorporating the low-level sensor 25 is attached in-line with the second vertical tube 35 and the Condulet 14 housing the sensing device 29 incorporating the high-level sensor 25 is attached in-line with the first vertical tube 34. Both vertical tubes are sized so that the top of each tube is equidistant from the top surface of the tank 50 or vessel 51 so that when the horizontal tube 32 is installed it is parallel with the top surface of the tank 50 or vessel 51. The length of the first vertical tube 34 whose bottom terminus is the top of the tank 50 or vessel 51 is dependent upon the length of the second vertical tube 35. The length of the second vertical tube 35, as measured upward from its bottom terminus at the top of the housing 41, is equal to the height of the tank 50 or vessel 51.

The Condulet 14 housing the sensing device 28 is located at a distance from the top of the housing 41 to the low-level sensor 24 that is equal to the distance from the bottom of the float assembly 40 (tank nearly empty) to the top surface of the tank 50 or vessel 51. The Condulet 14 housing the sensing device 29 and high-level sensor 25 is located on the first vertical tube 34 as close as physically possible to the surface of the tank 50 or vessel 51. Both Condulets 14 are attached to their respective vertical tubes in the same manner as described in the preferred embodiment section. The low-level magnet 11 and high-level magnet 12 are rigidly attached to the surface of the metal tape 31 by an adhesive such as epoxy. When the float 40 is at its lowest preselected level, the low-level magnet 11 is located on the tape 31 directly opposite the low-level sensor 24; likewise when the float 40 is at its highest preselected level the high-level magnet 12 is located directly opposite the high-level sensor 25.

Each Condulet 14 has an opening on one surface sized to accept and hermetically attach, if necessary, the respective sensing device 28 or 29. Inside each Condulet 14 and below the sensing device 28 and 29 there is also a tape guide structure 26 attached to the bottom of the Condulet 14, as best shown in FIG. 4, by an adhesive such as epoxy. The tape guide 26 is dimensioned to provide a space between the bottom of the low-level sensor 24 and high-level sensor 25 and the top surface of their corresponding low-level magnet 11 and high-level magnet 12 of no greater than 1.5875 cm (0.625 inches). This distance provides an optimum air coupling to allow an amplifier output located in the sensor 24 and 25 to switch "on". The detailed operation of the sensors 24 or 25 as well as the operation and description of all the other elements comprising the second embodiment is identical to that as described for the preferred embodiment.

The third embodiment of the Automatic Liquid Level Indicator and Alarm System 10, depicted in FIGS. 14 through 19, is also designed to be used in combination with the previously described liquid level gauging apparatus 30.

Figures 14, 15, 16:
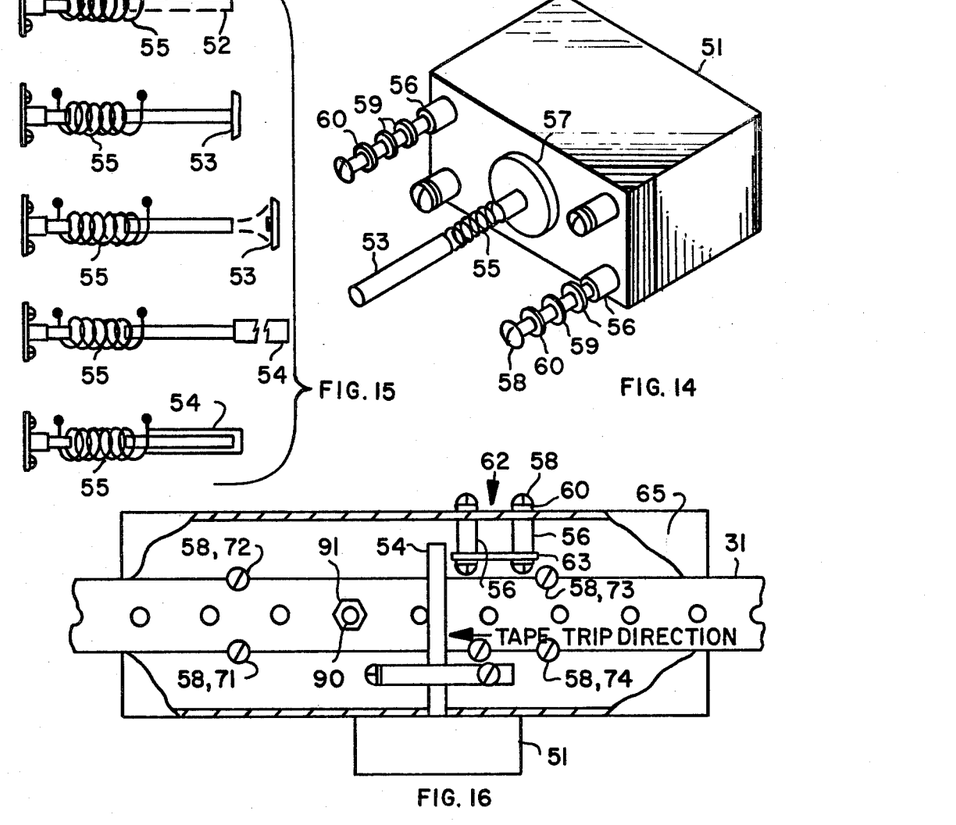
FIG. 14 is an isometric view of the sensitive mechanical switch showing the details of the "cat whisker" and the mounting configuration.
FIG. 15 depicts the sequential built-up and modifications to the "cat whisker".
FIG. 16 is a cutaway top view of the outlet box showing the details of the tape guides, switch trip arm restraining assembly, ramp assembly and other tape guide structural members.
Figure 17:
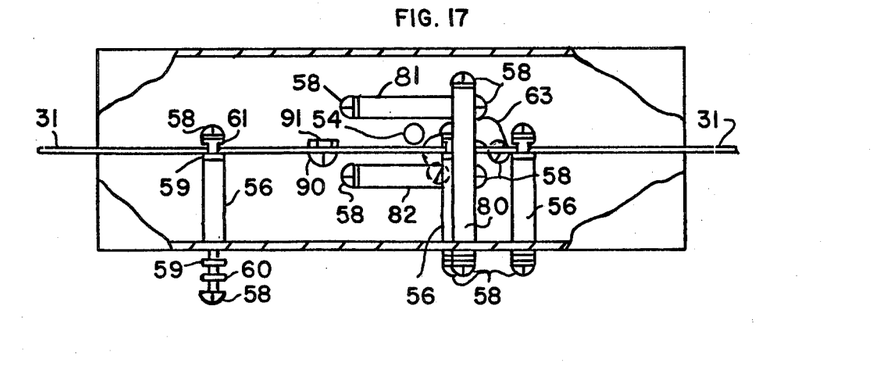
FIG. 17 is a cutaway side view of the outlet box showing the details of the tape guides, switch trip arm restraining assembly, ramp assembly and other tape guide structural members.

The third embodiment uses a sensitive switch 51 corresponding to a low-level position (tank nearly empty) and/or a second sensitive switch 51 corresponding to a high level position (tank nearly full). Each switch 51 is identical and each is attached to an identical outlet box 65 as shown in FIGS. 16 and 17. The switch 51 is a Type 802R-CWF manufactured by Allen-Bradley of Milwaukie, Wis. U.S.A. and the outlet box 65 is a Type OC5 manufactured by Killark Electric Manufacturing Company of St. Louis, Mo. U.S.A. fully complemented outlet box 65 is comprised of a switch 51, five tape guides 71-75, a trip-arm restraining assembly 80-82, and a ramp assembly 62. If only one liquid level alarm is required (low-level or a high-level) only one fully complemented outlet box 65 is required; if both a low-level and a high-level alarm is required it is necessary that two fully complemented outlet boxes 51 displaced from one another by 180 degrees be used. In either case the outlet box 51 is attached in-line with the in-line tube assembly.

Figure 18:
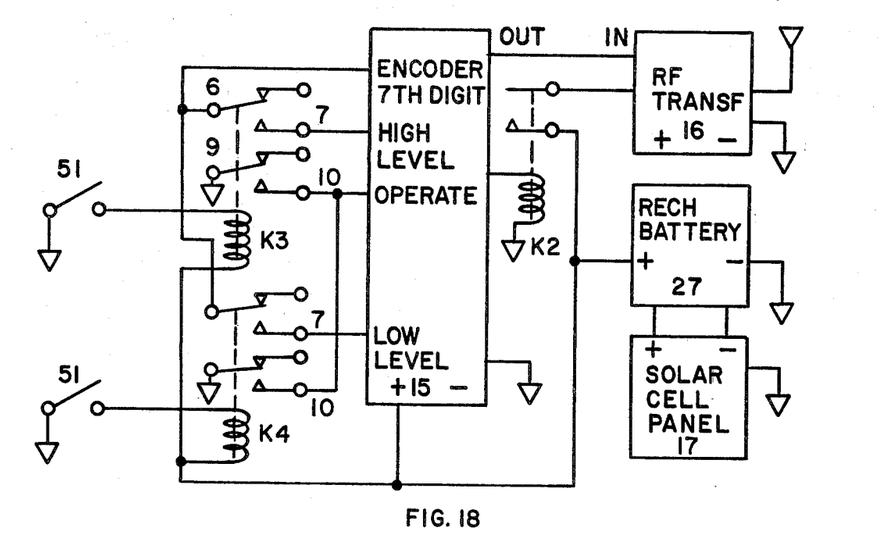
FIG. 18 is an electrical block diagram of the encoder-transmitter circuit used in the third embodiment.
Figure 19:
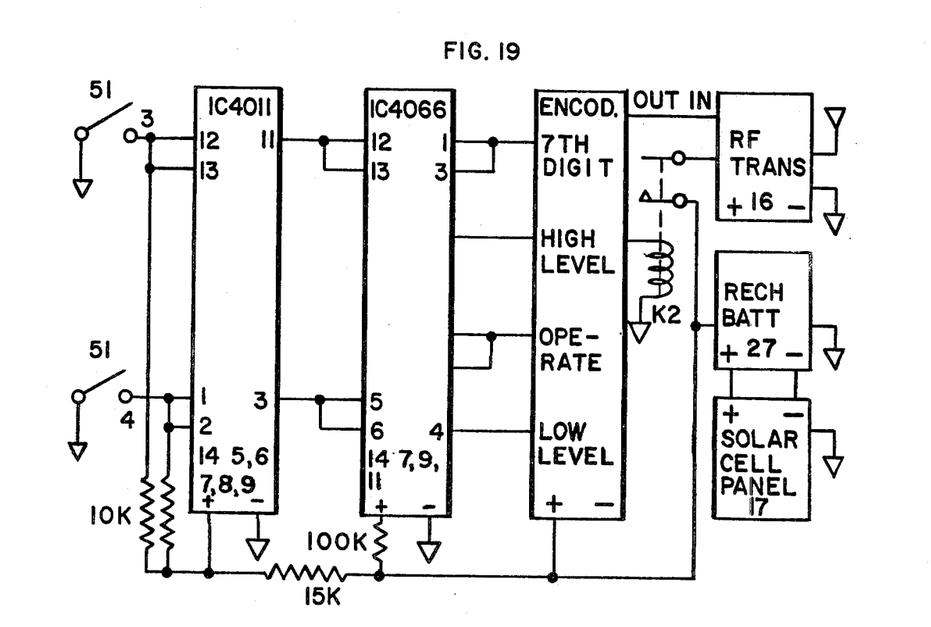
FIG. 19 is an electrical block diagram of the encoder-transmitter circuit showing the mechanical relays of FIGS. 12 and 19 replaced by solid state switching devices.

The switches 51, as shown electrically in FIG. 18, are used in lieu of the dual magnetic sensing device 13 and corresponding magnets 11 and 12. The switch performs the same function as the sensing device 13; that is, when a switch is closed, a ground circuit is completed via a relay K3 or K4 that causes the encoder 15 to become operational. The remainder of the system 10 is identical to that used with the preferred and second embodiments. The relays K3 and K4 may be replaced, in any of the invention embodiments, by a solid-state switching circuit consisting of a Quad Nand Gate 95 and a Quad Bilateral Switch 96. The Guad Gate 95 is a Type IC 4011 manufactured by Texas Instruments of Dallas, Tex. U.S.A. whereas the Quad Switch 96 is a Type IC 4066 also manufactured by Texas Instruments. The solid state circuit and applicable connections are shown in FIG. 19.

The switch 51 has a sensitive "cat whisker" trip arm 54 that allows the switch to be tripped without upsetting the overall balance of the apparatus 30 and system 10. However, to be used in the system the switch mounting surface and trip arm 54 must be modified. The mounting surface is modified by retapping the existing mounting holes to accommodate four roundhead machine screws 58. The trip arm is modified, as shown sequentially in FIG. 15, by first screwing into the spring 55 a nylon binderhead screw 53 such that a distance of 0.531 inches (1.349 cm) protrudes from the end of the spring after the head of the screw is cutoff. Next, a Teflon sleeve 54 is screwed into the screw 53 up to the end of the spring. The other end of the sleeve 54 is cut off flush with the end of the screw 53.

The modified switch 51 is mounted to the outlet box 65 by using the four screws 58 inserted through four corresponding standoffs 56 and washer 59, 60, and a center sealing washer 57. The modified trip arm is placed between the two horizontal members 81, 82 of the trip-arm restraining assembly 80-82 as shown in FIGS. 16 and 17.

The outlet box 65 is modified by cutting a switch mounting pattern and attaching the switch 51, attaching the five tape guides 71-75, attaching the trip-arm restraining assembly 80-82, and attaching the ramp assembly 62.

The five tape guides 71-75 each consist of a threaded standoff made of aluminum or other non-ferrous material. They are each attached to the bottom surface of the outlet box 65, that is the surface below the plane of the metal tape 31, by appropriate machine screws 58. At the top of each standoff there is a nylon washer 59 and a nylon shoulder washer 61 that is attached by a screw 58. With this configuration the tape 31 never touches a metal surface and is allowed to slide smoothly between each of the tape guides.

The trip-arm restraining assembly 80-82, as shown in FIGS. 16 and 17 is comprised of a vertical rod 80 having a threaded bore therein for mounting the rod to the bottom of the outlet box 65 with an appropriate machine screw 58. Attached to the top section of the vertical rod is a top horizontal rod 81 and a lower horizontal rod 82. Each horizontal rod is threaded and is attached to the vertical rod by an appropriate machine screw 58. The spacing between the two horizontal rods 81 and 82 is set to limit the displacement of the switch trip-arm 54 to a distance that will not trip the switch 51 when the tape 31 is moving in a non-trip direction.

The ramp assembly 62, is comprised of a barrier jumper 63 that is attached to the side of the outlet box 65 by a set of standoffs 56. The barrier jumper used in this embodiment is a Type 700-N4 manufactured and sold by Allen Bradley of Milwaukie, Wis. U.S.A.

The tape 31 is modified by attaching a switch trip button 90, 91 to the tape. The button is comprised of a nylon screw 90 and a corresponding nut 91. The screw 90 is inserted from the bottom of the tape through one of the existing holes in the tape 31. The tape hole is selected to correspond to either a tank nearly-full condition and/or tank nearly-empty condition. When the tape is moving in a trip direction, that is a direction where the tripping of switch 51 is desired, the trip button 90, 91 strikes and moves the switch trip arm 54 a sufficient distance to cause the switch 51 to make contact. When the switch makes contact the applicable connected relay K3 or K4, or the solid state devices 95, 96 is energized as shown in FIG. 19 or FIG. 20 respectively.

When the tape is moving in a non-trip direction, that is a direction where the tripping of switch 51 is not desired, the trip button 91 strikes the switch trip arm 54 and causes the arm to make contact with and be lifted by the ramp assembly 62. The trip arm restraining assembly 80-82 allows the switch trip arm 54 to be displaced sufficiently to allow the trip button 91 to slide under the trip arm and not cause the switch 51 to make contact.

The preferred, second and third embodiments of the invention have been explicitly described in terms of their use with an existing liquid level gauging apparatus 30. However, it should be understood that the use of the System 10 is not intended to be limited to the preferred, second, or third embodiment. In fact, the System 10 can be adapted for use with any apparatus that uses a moving tape 31 to indicate a change in level of any substance. For example, another embodiment could have a magnet 11 or 12 attached to the tape 31 at a location indicative of a half-filled vessel 51. Thus, when the magnet 11 or 12 is juxtaposed with the magnetic sensing device 13, whether the tape 31 travel is in an up or down direction, a signal would be produced by the sensing device 13 that subsequently energizes a display 20 and an audible alarm 21 to alert concerned station personnel. It is also not intended to limit the invention to the precise construction shown in the accompanying figures it being apparent that such figures can be varied without departing from the spirit and scope of the invention.

INDUSTRIAL APPLICABILITY

The Automatic Liquid Level Indicator and Alarm System is particularly suitable for exploitation in the petroleum industry where petroleum storage tanks are maintained on large tank farms. The System provides a safe and reliable method to alert tank farm personnel when a specific tank has reached a nearly full or nearly empty condition.

I claim:

1. An automatic liquid level indicator and alarm system used with and in combination with an existing apparatus having means to displace a tape from one position to another where said tape displacement is indicative of a change in liquid level, where said system comprises:
   (a) a permanent magnet rigidly attached to said tape;
   (b) a sensing device having means to sense and emit a signal when said magnet is in juxtaposition with said sensing device;

(c) an encoder electrically connected to said sensing device for encoding the signal emitted from said sensing device;
(d) an RF transmitter electrically connected to said encoder for transmitting the encoded signal;
(e) an RF receiver frequency-tuned to receive the encoded signal transmitted by said RF transmitter;
(f) a decoder electrically connected to said RF receiver for decoding the encoded signal;
(g) a display device electrically connected to said decoder for visually displaying the decoded signal;
(h) an audible alarm electrically connected to said decoder that is energized simultaneously with the displaying of said decoded signal; and
(i) means for powering said sensing device; said encoder, said RF transmitter, said RF receiver, said decoder, said display device, and said audible alarm.

2. An automatic liquid level indicator and alarm system used with, and in combination with an existing liquid level gauging apparatus, where said apparatus is used for measuring the level of a liquid within a vessel and with said apparatus having a metal tape located and transported within a tube assembly by a set of wheel pulleys, where one end of said tape is connected to a float assembly located within said vessel and where other end is connected to a take-up reel mechanically linked to a mechanism that provides a direct visual reading of the liquid level in said vessel, where said system comprises:
(a) a low-level permanent magnet rigidly attached to said tape;
(b) a high-level permanent magnet rigidly attached to said tape;
(c) a dual sensing device incoporating a low-level sensor and a high-level sensor where said sensors have means to detect a magnetic field and to supply a d-c current when either said low-level magnet or high-level magnet is in juxtaposition with respective said low-level sensor or high-level sensor;
(d) a conduit outlet box attached in-line with said tube assembly and having an opening on one surface sized to accept and attach said dual sensing device;
(e) a tape guide structure rigidly attached to inside and opposite the opening of said conduit outlet box;
(f) an encoder electrically connected to said dual sensing device for encoding the signal emitted from said dual sensing device;
(g) an RF transmitter electrically connected to said encoder for transmitting the encoded signal;
(h) an RF receiver frequency-tuned to receive the encoded signal transmitted by said RF transmitter;
(i) a decoder electrically connected to said RF receiver for decoding the encoded signal;
(j) a display device electrically connected to said decoder for visually displaying the decoded signal;
(k) a low-level flasher activated by a low-level trigger oscillator that is triggered by a signal from said display device;
(l) a high-level flasher activated by a high-level trigger oscillator that is triggered by a signal from said display device;
(m) an audible alarm electrically connected to said decoder that is energized simultaneously with the displaying of said decoded signal; and
(n) means for powering said sensing device; said encoder; said RF transmitter, said RF receiver, said decoder, said display device, and said audible alarm.

3. An automatic liquid level indicator and alarm system used with, and in combination with an existing liquid level gauging apparatus, where said apparatus is used for measuring the level of a liquid within a vessel, and with said apparatus having a tube assembly consisting of a first vertical tube, a horizontal tube, and a second vertical tube, a metal tape located and transported within said tube assembly by a set of wheel pulleys, where one end of said tape is connected to a float assembly located within said vessel and where other end is connected to a take-up reel mechanically linked to a mechanism that provides a direct visual reading of the liquid level in said vessel, where said system comprises:
(a) a low-level permanent magnet rigidly attached to said tape;
(b) a high-level permanent magnet rigidly attached to said tape;
(c) a first sensing device incorporating a low-level sensor having means to detect a magnetic field and to supply a d-c current when said low-level magnet is in juxtaposition with said low-level sensor;
(d) a second sensing device incorporating a high-level sensor having means to detect a magnetic field and to supply a d-c current when said high-level magnet is in juxtaposition with said high-level sensor;
(e) a conduit outlet box attached in line with said second vertical tube and having an opening on one surface sized to accept and attach said first sensing device;
(f) a conduit outlet box attached in line with said first vertical tube and having an opening on one surface sized to accept and attach said second sensing device;
(g) a tape guide structure rigidly attached to inside and opposite the opening of each said conduit outlet box;
(h) an encoder electrically connected to said first sensing device and said second sensing device for encoding the signal emitter from said first and second sensing devices;
(i) an RF transmitter electrically connected to said encoder for transmitting the encoded signal;
(j) an RF receiver frequency-tuned to receive the encoded signal transmitted by said RF transmitter;
(k) a decoder electrically connected to said RF receiver for decoding the encoded signal;
(l) a display device electrically connected to said detector for visually displaying the decoded signal;
(m) a low-level flasher activated by a low-level trigger oscillator that is triggered by a signal from said display device;
(n) a high-level flasher activated by a high-level trigger oscillator that is triggered by a signal from said display device;
(o) an audible alarm electrically connected to said decoder that is energized simultaneously with the displaying of said decoded signal; and
(p) means for powering said sensing devices, said encoder, said RF transmitter, said RF receiver, said decoder, said display device, and said audible alarm.

4. An automatic liquid level indicator and alarm system used with, and in combination with an existing liquid level gauging apparatus, where said apparatus is used for measuring the level of petroleum stored in a storage tank of the type located on petroleum tank farms, and with said apparatus having a metal tape located and transported within a hermetic tube assembly by a set of wheel pulleys, where one end of said tape is connected to a float assembly located within said tank and where other end is connected to a take-up reel mechanically linked to a mechanism that provides a direct visual reading of the liquid level in said tank, where said system comprises:

(a) a low-level permanent magnet rigidly attached to said tape;
(b) a high-level permanent magnet rigidly attached to said tape;
(c) a dual sensing device incorporating a low-level sensor and a high-level sensor where said sensors have means to detect a magnetic field and to supply a d-c current when either said low-level magnet or high-level magnet is in juxtaposition with respective said low-level sensor or high-level sensor;
(d) a conduit outlet box hermetically attached in-line with said tube assembly and having an opening on one surface sized to accept and hermetically attached said dual sensing device;
(e) a tape guide structure rigidly attached to inside and opposite the opening of said conduit outlet box;
(f) an encoder electrically connected to said dual sensing device for encoding the signal emitted from said dual sensing device, and where electrical connection is spark suppressed;
(g) an RF transmitter electrically connected to said encoder for transmitting the encoded signal, and where electrical connection is spark suppressed;
(h) an RF receiver frequency-tuned to receive the encoded signal transmitted by said RF transmitter;
(i) a decoder electrically connected to said RF receiver for decoding the encoded signal;
(j) a alpha-numeric display device electrically connected to said decoder for visually displaying the decoded signal;
(k) a low-level flasher activated by a low-level trigger oscillator that is triggered by a signal from said display device;
(l) a high-level flasher activated by a high-level trigger oscillator that is triggered by a signal from said display device;
(m) an audible alarm electrically connected to said decoder that is energized simultaneously with the displaying of said decoded signal; and
(n) means for powering said sensing device, said encoder, said RF transmitter, said RF receiver, said decoder, said display device, and said audible alarm.

5. The system as specified in claims 2, 3 or 4 wherein said low-level magnet is juxtaposed with said low-level sensor when said float is located at its lowest level corresponding to a tank nearly empty condition.

6. The system as specified in claims 2, 3 or 4 wherein said high-level magnet is juxtaposed with said high-level sensor when said float is located at its highest level corresponding to a tank nearly full condition.

7. The system as specified in claims 2, 3 or 4 wherein the means by which said low-level sensor or high-level sensor sense a magnetic field and supply a d-c current is accomplished by each sensor further comprising a magnetically-activated electronic digital switch utilizing the Hall effect for sensing the magnetic field.

8. An automatic liquid level indicator and alarm system used in combination with an existing apparatus having means to displace a tape from one position to another where said tape displacement is indicative of a change in liquid level, where said system comprises:

(a) a switch;
(b) means for tripping said switch when said tape passes said switch;
(c) an encoder, electrically connected to said switch, that emits an encoded signal when said switch is tripped;
(d) an RF transmitter electrically connected to said encoder for transmitting the encoded signal;
(e) an RF receiver frequency-tuned to receive the encoded signal transmitted by said RF transmitter;
(f) a decoder electrically connected to said RF receiver for decoding the encoded signal;
(g) a display device electrically connected to said decoder for visually displaying the decoded signal;
(h) an audible alarm electrically connected to said decoder that is energized simultaneously with the displaying of said decoded signal; and
(i) means for powering said encoder, said RF transmitter, said RF receiver, said decoder, said display device, and said audible alarm.

9. An automatic liquid level indicator and alarm system used in combination with an existing liquid level gauging apparatus, where said apparatus is used for measuring the level of a liquid within a vessel and with said apparatus having a metal tape located and transported within a tube assembly by a set of wheel pulleys, where one end of said tape is connected to a float assembly located within said vessel and where other end is connected to a take-up reel, where said system comprises:

(a) a switch having a sensitive trip arm;
(b) an outlet box attached in-line with said tube assembly and having an opening on one surface sized to accept and attach said switch;
(c) a plurality of tape-guides each rigidly attached to the inside surface of said outlet box below the plane of said tape whereby said tape guides allow said tape to pass smoothly between each of said tape guides at a constant level with respect to the center of the trip arm of said switch;
(d) a ramp assembly rigidly attached to the inside surface of said outlet box at a side opposite the attach side of said switch;
(e) a switch trip button rigidly attached to the top surface of said tape such that when said tape is moving in a trip direction said button strikes the trip arm of said switch causing said switch to trip and make contact and when said tape is moving in a non-trip direction said button strikes the trip arm of said switch and causes the arm to make contact with and be lifted by said ramp assembly to a sufficient distance that allows said button to slide under the trip arm without causing said switch to make contact;
(f) a switch trip arm restrainment structure rigidly attached to the inside surface of said outlet box between edge of said tape and mounting side of said switch and that is configured to restrain the movement of the trip arm so that when said tape is moving in a non-trip direction said structure in combination with said ramp assembly limits the displacement of the trip arm to prevent said switch from making contact;

(g) an encoder, electrically connected to said switch, that encodes and emits a signal when said switch makes contact;

(h) an RF transmitter electrically connected to said encoder for transmitting the encoded signal;

(i) an RF receiver frequency-tuned to receive the encoded signal transmitted by said RF transmitter;

(j) a decoder electrically connected to said RF receiver for decoding the encoded signal;

(k) a display device electrically connected to said decoder for visually displaying the decoded signal;

(l) a low-level flasher activated by a low-level trigger oscillator that is triggered by a signal from said display device;

(m) a high-level flasher activated by a high-level trigger oscillator that is triggered by a signal from said display device;

(n) an audible alarm electrically connected to said decoder that is energized simultaneously with the displaying of said decoded signal; and (o) means for powering said encoder; said RF transmitter, said RF receiver, said decoder, said display device, and said audible alarm.

10. An automatic liquid level indicator and alarm system used in combination with an existing liquid level gauging apparatus, where said apparatus is used for measuring the level of a liquid within a vessel and with said apparatus having a metal tape located and transported within a tube assembly by a set of wheel pulleys, where one end of said tape is connected to a float assembly located within said vessel and where other end is connected to a take-up reel, where said system comprises:

(a) two fully complemented outlet boxes attached in-line with said in-line tube assembly and where said outlet boxes are displaced from one another by 180 degrees;

(b) two said switch trip buttons rigidly attached to the top surface of said tape where one said button corresponds to a low-level position and where other said button corresponds to a high-level position;

(c) an encoder electrically connected to both of said switches in said outlet boxes via a set of sensitive relays where said encoder encodes a signal when either of said relays is energized by the tripping of either of said switches.

(d) an RF transmitter electrically connected to said encoder for transmitting the encoded signals;

(e) an RF receiver frequency-tuned to receive the encoded signal transmitted by said RF transmitter;

(f) a decoder electrically connected to said RF receiver for decoding the encoded signal;

(g) a display device electrically connected to said decoder for visually displaying the decoded signal;

(h) a low-level flasher activated by a low-level trigger oscillator that is triggered by a signal from said display device;

(i) a high-level flasher activated by a high-level trigger oscillator that is triggered by a signal from said display device;

(j) an audible alarm electrically connected to said decoder that is energized simultaneously with the displaying of said decoded signal; and (k) means for powering said encoder; said RF transmitter; said RF receiver; said decoder, said display device, and said audible alarm.

11. The system as specified in claims 1, 2, 3, or 4, wherein the means for powering said sensing device, said encoder, and said RF transmitter is by a rechargeable battery pack.

12. The system as specified in claim 11 further comprising a solar-cell panel located on a surface of said RF transmitter where said solar cell panel maintains correct charge on said rechargable battery pack.

13. The system as specified in claims 8, 9, or 10 wherein the means for powering said encoder, and said RF transmitter is by a rechargeable battery pack.

14. The system as specified in claims 1, 2, 3, 4, 8 or 9 wherein the means for powering said RF receiver, said decoder, said display device, and said audible alarm is from an a-c power source.

15. The system as specified in claim 14 further comprising a standby rechargeable battery pack and associated circuitry to automatically connect said battery pack into the power circuit in the event of an a-c power failure.

16. The system as specified in claims 1, 2, 3, 4, 8, or 9 wherein said encoder and said RF transmitter are contained in same enclosure.

17. The system as specified in claims 1, 2, 3, 4, 8 or 9 wherein said RF receiver and said decoder are contained in same enclosure.

18. The system as specified in claim 10 wherein said encoder is electrically connected to both of said switches in outlet box via a solid-state switching circuit where said encoder encodes a signal when said solid-state switching circuit is enabled by the tripping of either of said switches.

* * * * *